UNITED STATES PATENT OFFICE.

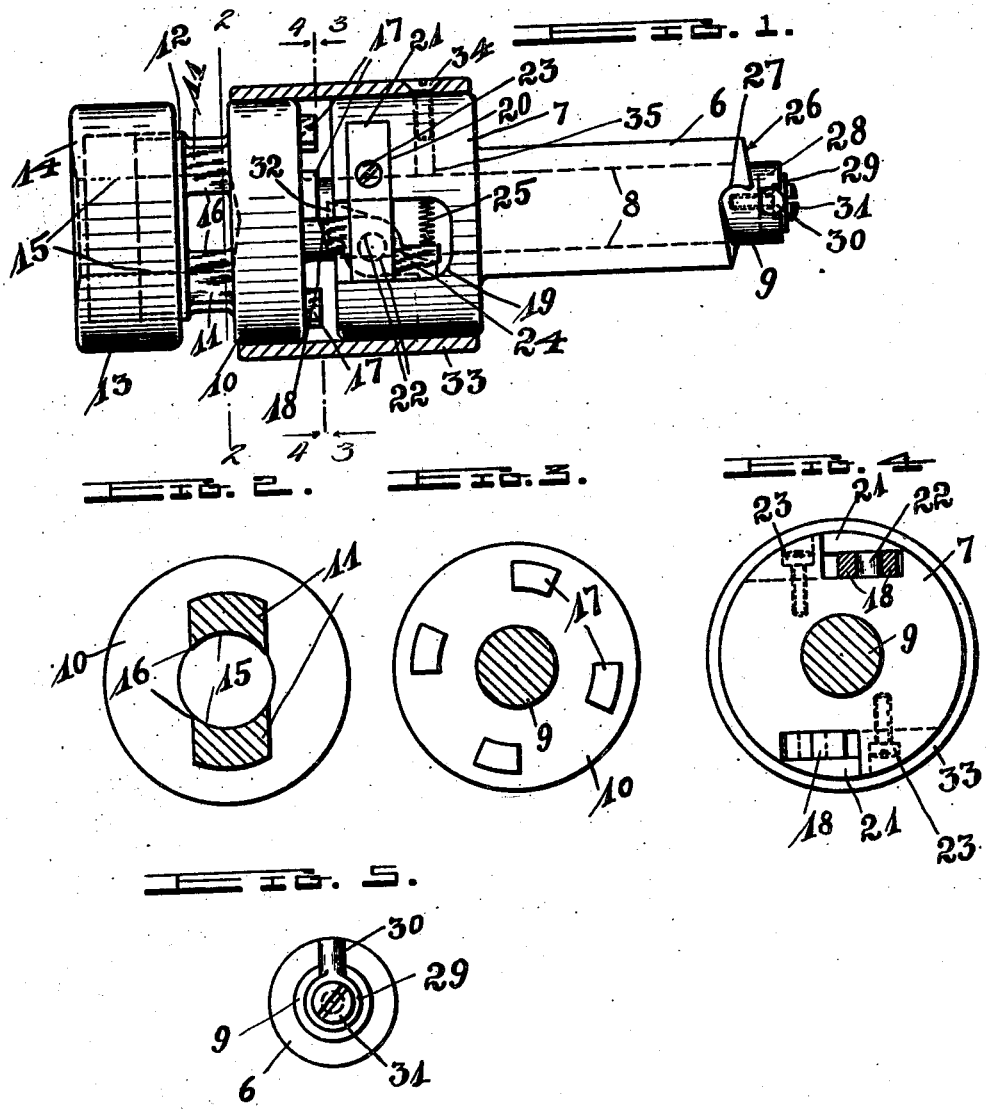

EDWARD E. RUSSELL, OF LOS ANGELES, CALIFORNIA.

CHUCK.

1,295,798.  Specification of Letters Patent.  Patented Feb. 25, 1919.

Application filed November 6, 1917. Serial No. 200,523.

*To all whom it may concern:*

Be it known that I, EDWARD E. RUSSELL, a citizen of the United States, residing at Los Angeles, in the county of Los Angeles and State of California, have invented a new and useful Chuck, of which the following is a specification.

My invention relates to chucks for machine-tools and has for its main object to prevent the breaking of the tool or the breaking of the material finished by the tool.

Another object is to provide a chuck which can be used on a turret head of a machine-tool.

Another object is to provide a catch within the tool which will prevent the wearing off of the engaging part of the catch when the turret head has been stopped in its movement on the machine-tool.

Another object is to provide a catch within the chuck which will turn away from the engaging part in the chuck when the chuck comes to a stopping point on the work.

Another object is to construct a chuck embodying my invention for a die holder on the turret head of a machine-tool.

Another object is to construct such chuck that the work can be seen when passing through the die in such chuck.

Another object is to provide engaging means within the tool for unscrewing the die from the work without touching the engaging parts within the chuck for operating the chuck when turning in the right direction for threading with the die in the tool.

Other objects will appear from the following description and appended claims as well as from the accompanying drawing.

In the drawing:—

Figure 1 is a side view of my device with the inclosing sleeve shown in section.

Fig. 2 is a cross-section on line 2—2 of Fig. 1.

Fig. 3 is a cross-section through my device seen in the direction of the arrows 3—3 in Fig. 1.

Fig. 4 is a cross-section of my device seen in the direction of the arrows 4—4 in Fig. 1.

Fig. 5 is an end view of the engaging means on my device for withdrawing the chuck from the work.

In Fig. 1, 6 designates the stock of my device to be secured to the machine-tool especially to the turret head of such machine-tool. This stock is provided with a head 7, the whole being provided with a bore 8 through which a stem 9 slidingly and turnably fits. The stem 9 is also provided with a head 10 of similar diameter as the head 7 on the stock. The head 10 is provided with extensions 11 terminating in a threaded end 12. A ring 13 fits turnably on the threaded end 12 for screwing a die to the stem, for this a shoulder 14 in the front end of the ring 13 is provided leaving a space between this shoulder 14 and the end of the threaded end 12 within the ring.

A bore 15 is provided through the threaded end 12 and the extensions 11 toward the head 10 leaving a free space 16 between the extensions 11 so that the work may be seen when passing through the die inserted in the ring 13 and through the threaded end 12. On the rear side of the head 10 a clutch is formed by the jaws 17 projecting toward the head 7. Within the head 7 dogs 18 are pivotally mounted to engage with the jaws 17 on the head 10. A suitable recess 19 is cut for each dog into the side of the head 7 and the suitable recesses 20 are provided for the blocks 21. The blocks 21 are secured to the head by the screws 23 having round lugs 22, forming the pivot for the dogs. Counteracting levers 24 are provided on the dogs on the opposite side of the catch part of the dogs 18. A spring 25 is inserted into each of the recesses 19 seated in the recess against the counteracting levers 24. The end 26 of the stock 6 is helical-shaped forming a shoulder 27. The end of the stem 9 is provided with a recess 28 for the body 29 of the pin 30. The pin 30 is secured to the end of the stem 9 by the screw 31.

Having disposed the stock 6 of this tool into a proper place on the machine tool especially in the turret head of a lathe, as soon as such tool is brought into contact with the work on the lathe, the head 10 on the stem naturally presses toward the head 7 on the stock and the jaws 17 are made to engage with the dogs 18, when a die inserted into this tool naturally becomes stationary with the tool, and the turning work in the lathe moves into and through the die in the desired manner until the turret head comes to a position in which a stop on the machine tool disengages the turret head from a further shifting movement with the lathe as will easily be understood.

Coming to such stopping position the dogs 18 disengage from the jaws 17, and the spring 25 pushes the dogs into the position indicated at 32, taking the engaging ends of the dogs far enough away from the jaws 17 so that a further turning of the work will not wear off the sharp points of the engaging parts on the dogs. This is of great advantage as under such construction the dogs will not be liable to a wearing-off by the passing of the jaws while the work with the die on it is still turning with the lathe insuring always the same distance in the travel of the tool toward the work which is desired by turret heads on turret machine tools.

Having finished the work such turret heads are naturally withdrawn by reversing the machine-tool and in this device, by reversing the machine tool and thereby the rotation of the work, the stock 6 moves on the stem 9 toward the pin 30 until the shoulder 27 on the stock engages with the pin 30 when the tool is withdrawn from the work as will easily be understood.

To protect the jaws and the dogs from dust and waste material a sleeve 33 is provided to inclose the two heads 7 and 8 with the operating mechanism in such heads. The screw 34 serves to screw the sleeve 33 to the head 7 and at the same time close an oiling hole 35 for getting oil between the stock 6 and the stem 9.

This device is especially adapted for small work.

Having thus described my invention, I claim:—

1. In a chuck of the class described comprising a stock end and a tool-holding end, a suitable number of dogs pivotally mounted within the tool having each a beveled end for engaging the stock part with the tool-holding part adapted to clear when not so engaged, the long part of the beveled ends forming the engaging part when stock and tool-holding part are in engaging position during the threading or working, and operating means for holding the dogs in such clearing position when not engaging the stock and tool-holding ends.

2. In a chuck of the class described comprising a stock part to be secured to a suitable place on the machine tool and a tool-holding part turnably disposed in the stock part having jaw members facing the stock part, a suitable number of dogs pivotally secured to the stock part having means for automatically turning out of the way of the jaw members on the tool-holding part the moment when the dogs disengage from the jaw members while the jaw members with the tool-holding part is still rotating.

3. In a chuck of the class described comprising a stock part to be secured to a suitable place on the machine tool and a tool-holding part turnably disposed in the stock part having jaw members facing the stock part, a suitable number of dogs pivotally secured to the stock part of the chuck having a beveled engaging member each facing with the longer side the jaws on the tool-holding member or part, and a suitable number of springs disposed between dogs and the stock part for holding the beveled ends of the dogs spaced from the jaws on the tool-holding part when the tool-holding part is still engaged with the work.

In testimony whereof I hereunto affix my signature in the presence of two witnesses.

EDWARD E. RUSSELL.

Witnesses:
OTTO H. KRUEZER,
M. W. OLDS.

Copies of this patent may be obtained for five cents each, by addressing the "Commissioner of Patents, Washington, D. C."